US006251962B1

(12) United States Patent
Desobry (10) Patent No.: US 6,251,962 B1
(45) Date of Patent: Jun. 26, 2001

(54) (CO)POLYMERS BY PHOTOPOLYMERIZATION

(75) Inventor: Vincent Desobry, Marly (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/367,562

(22) PCT Filed: Feb. 9, 1998

(86) PCT No.: PCT/EP98/00712

§ 371 Date: Aug. 16, 1999

§ 102(e) Date: Aug. 16, 1999

(87) PCT Pub. No.: WO98/37105

PCT Pub. Date: Aug. 27, 1998

(30) Foreign Application Priority Data

Feb. 19, 1997 (EP) .................................. 97102677

(51) Int. Cl.[7] ................ C08F 2/50; C08F 2/48; C08F 20/18; C08F 18/08
(52) U.S. Cl. ................ 522/18; 522/42; 522/64; 522/177; 522/178; 522/182; 526/193; 526/208; 526/328; 526/328.5; 526/329; 526/329.1; 526/329.2; 526/329.3; 526/329.7; 526/330
(58) Field of Search ................ 522/18, 42, 64, 522/178, 182, 177; 526/193, 208, 328, 328.5, 329, 329.1, 329.2, 329.3, 329.7, 330

(56) References Cited

U.S. PATENT DOCUMENTS

| 3,962,201 | * | 6/1976 | Dulog et al. . |
| 4,298,738 | * | 11/1981 | Lechtken et al. . |
| 4,501,868 | * | 2/1985 | Bouboulis et al. . |
| 4,721,734 | * | 1/1988 | Gehlhaus et al. . |
| 4,758,642 | * | 7/1988 | Yezrielev et al. . |
| 5,401,804 | * | 3/1995 | Georges et al. . |
| 5,436,280 | * | 7/1995 | Medsker, II et al. . |
| 5,891,931 | * | 4/1999 | Leboeuf et al. . |
| 5,902,836 | * | 5/1999 | Bennett et al. . |
| 5,942,290 | * | 8/1999 | Leppard et al. . |

* cited by examiner

Primary Examiner—Susan W. Berman
(74) Attorney, Agent, or Firm—Tyler A. Stevenson (57) ABSTRACT

A Process for the selective preparation acrylate- or methacrylate-homo- or acrylate- or methacrylate-co-oligomers with a weight average molecular weight (Mw) from 1000 to 20000, a polydispersity $\leq 3$ and a conversion of the monomers to polymers greater than or equal to 70%, or for the selective preparation of polyvinylacetate and its hydrolysis product polyvinylalcohol with a weight average molecular weight (Mw) from 1000 to 25000, a polydispersity $\leq 3$ and a conversion of the monomers to polymers greater than or equal to 70%, is characterized in that a mixture of the corresponding monomers is irradiated in the presence of a specific photoinitiator or photoinitiator mixture at a temperature from −20 to 70° C. in an inert solvent or inert solvent mixture, with light of a wavelength from 305 to 450 nm, wherein the contents of monomers in the reaction mixture is up to 70%.

16 Claims, 2 Drawing Sheets

FIG.1

SET-UP (B)

(CO)POLYMERS BY PHOTOPOLYMERIZATION

The invention is directed to a process for selectively preparing acrylate-, methacrylate- or vinylacetate-homo- and copolymers of specific molecular weight ranges.

In the DE-A-32 19 121 an emulsion polymerization process, which is conducted in a specific reactor and which process is initiated by irradiation with ultraviolet light, is described. A process for continuously preparing an acrylic polymer gel (in the form of a film) by irradiating the monomer on a moving support is disclosed in U.S. Pat. No. 5,004,761. In JP-A Hei 04 248802 and JP-A Hei 04 248803 a polymerization process initiated by ultraviolet light, wherein the rate of polymerization is controlled by adjusting the light irradiation and speed of reaction solution supply, is disclosed and additionally specifically designed reactors are described.

For specific technical uses it is important to obtain oligomers or polymers with defined properties. Desirable are, for example, a specific range of the number average molecular weight, as well as specific values for the polydispersity. Further, with respect to the structure of the oligomers and polymers for specific technical uses special requirements are to be fulfilled. So, for many applications it is necessary to employ straight chain oligomers.

It is therefore the object of the present invention to provide a process for manufacturing polymers with a specific molecular weight, polydispersity and conversion.

It has been found that this can be achieved by employing specific photoinitiators and process parameters.

Object of the instant application is a process for the preparation of acrylate- or methacrylate-homo- or acrylate- or methacrylate-co-oligomers with a weight average molecular weight (Mw) from 1000 to 20000, a polydispersity ≦3 and a conversion of the monomers to polymers greater than or equal to 70%, characterized in that at least one acrylic or methacrylic monomer or a mixture of said acrylic monomers with styrene or with vinylacetate, butadiene, acrylamide, acrylonitrile, vinylidene chloride or vinyl chloride is irradiated in the presence of at least one α-hydroxyketone photoinitiator or at least one phosphorus containing photoinitiator or a mixture of an α-hydroxyketone photoinitiator with a phosphorus containing photoinitiator, said photoinitiator or photoinitiator mixture having a molar extinction coefficient ε from 0.1–2000 and at least one maximum of absorption, useful for the generation of radicals, in the range from 305 to 450 nm, at a temperature from –20 to 70° C.

in a solvent or solvent mixture, with light of a wavelength from 305 to 450 nm, where the concentration of the polymer in the final solution is up to 80%.

A further object of the invention is a process for the preparation of polyvinylacetate and its hydrolysis product polyvinylalcohol with a weight average molecular weight (Mw) from 1000 to 30000, a polydispersity ≦3 and a conversion of the monomers to polymers greater than or equal to 70%, characterized in that vinylacetate or a mixture of said vinylacetate with other vinylic monomers is irradiated in the presence of at least one α-hydroxyketone photoinitiator, at least one phosphorus containing photoinitiator or a mixture of an α-hydroxyketone photoinitiator with a phosphorus containing photoinitiator, said photoinitiator or photoinitiator mixture having a molar extinction coefficient ε from 0.1–2000 and at least one maximum of absorption in the range from 305 to 450 nm, at a temperature from –20 to 70° C.

in a solvent or solvent mixture, with light of a wavelength from 305 to 450 nm, where the concentration of the polymer in the final solution is up to 80%.

The photoreactor used is fabricated in Rodoxal, an aluminum alloy, but suitable reactors can also be constructed, for example in stainless steel or in any material compatible with the monomers employed, as for example teflon, brown glass etc. The reactor possesses a glass window allowing transmission of the UV-light. The overall irradiation surface of the reactor used to prepare some of the examples of the instant application is 13 cm$^2$ and the cell thickness is 1 cm. In this connection the "overall irradiation surface" of the reactor means the surface of the irradiated part of the reactor, namely the window and the "cell thickness" is the thickness of the internal path (diameter) of the reactor at the irradiated part. The process can also be carried out using an optical bench and a UV-cell for absorption spectra fitted with a septum to allow reactions under argon and a magnetic stirrer. This UV-cell, similar to those used to measure UV-spectra, is irradiated through a 2 cm$^2$ window with homogeneous light from a Philips 100 W medium pressure mercury lamp and the cooling is effected through the side walls of the cell.

But also bigger reactor dimensions are possible, as for example an overall irradiation surface (window size) of 26 cm$^2$ with a cell thickness (diameter) of 1 cm. In this case, lamps of higher output and bigger irradiation surfaces such as, for example, Fusion Curing lamps F200 to F600 are used. As those commercially available lamps have a bulb length of 6 inches (about 15.5 cm; F200 lamp) or 10 inches (about 25 cm; F600 lamp), the reactor should not exceed this height. The irradiation surface can thus be adapted to the necessary reaction conditions. Naturally, for the instant process it is also possible to employ reactors with other dimensions. The crucial point is to guarantee a controlable and homogenic generation of radicals of the photoinitiator throughout the reactor, which is achieved, by controling the flow of the mixture and the distribution of radicals in the mixture by stirring and appropriate irradiation. This not dependant on the size of the reactor or the irradiation surface.

In FIGS. 1 to 3 the reactors, which were employed to prepare the examples of the instant application are shown.

Two different set-ups were used.

FIG. 1 shows the side view of the set-up (A). Through the reactor (1) a homogeneous flow of the monomers to be polymerized is indicated by (6). The light emitted from the lamp (3) reaches the polymerizable mixture through the reactor window (2). The lamp in set-up (A) is a H or D-bulb fusion lamp with 6 inches (about 15.5 cm) length. (4) designates the power supply of the fusion lamp. The values for the distance (5) between the lamp and the reactor window vary and are indicated specifically in the examples.

FIG. 2 gives the side view of the set-up (B). Set-up (B) is a modification of set-up (A) and the elements (1) to (6) are as described for FIG. 1. The difference between set-up (A) and set-up (B) lies in the feature (7), which is a copper can wrapping the outlet of the light, and wherein the light only comes out of a slot.

Figure 1:
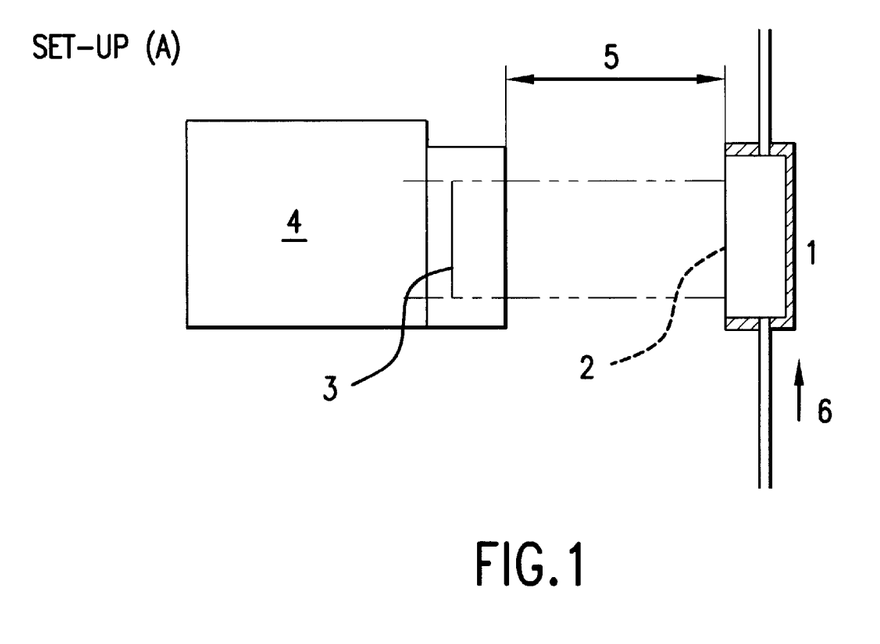
Figure 2:
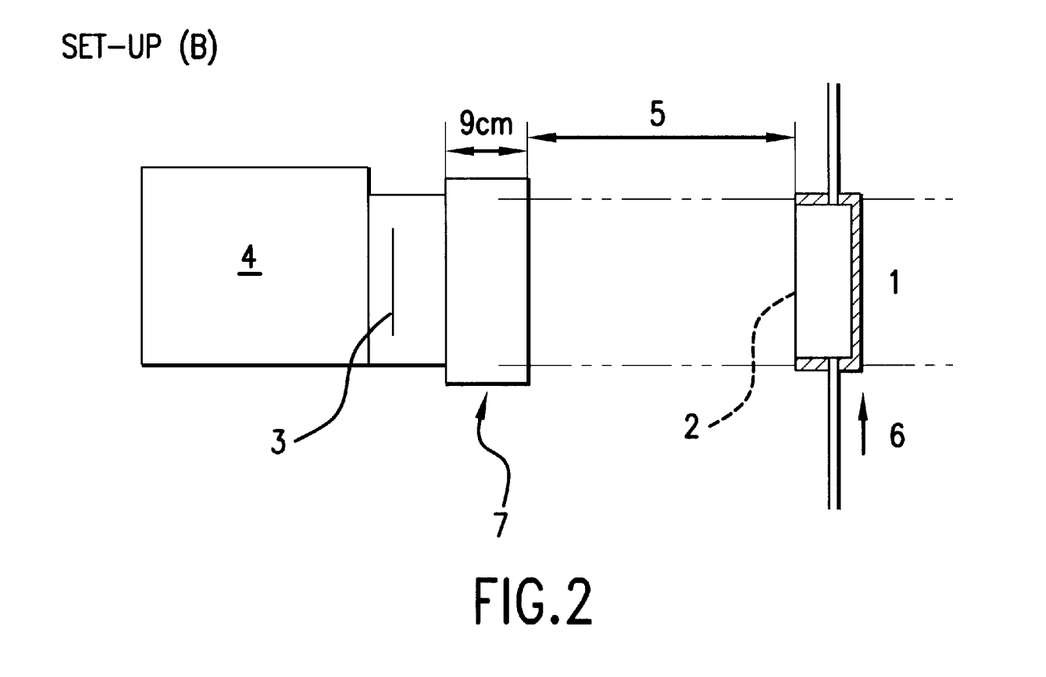
Figure 3:
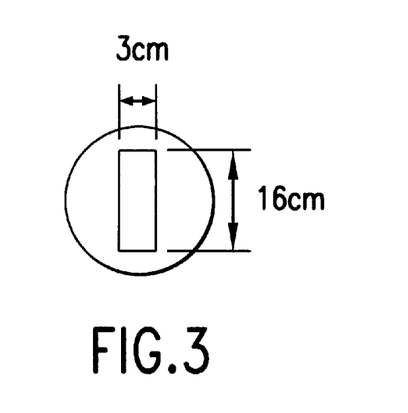
FIG. 3 gives the front view of this wrapping, showing the slot and its dimensions.

Advantageously the process according to the invention is carried out in an inert gas atmosphere using, for example, argon or nitrogen as protective gas.

To allow the solution to be properly mixed and irradiated in a homogenic fashion it is circulated through the cell, for example by a magnet driven gear pump at a constant speed. The circulation can be regulated by any device, suitable to guarantee a homogeneous reaction mixture. Additionally to the generation of the homogeneous flow, the reaction mixture has to be stirred. In the examples of the instant application, for example a flow speed of 100 ml/min is used. It is also possible to work the instant process with other flow speeds. The circulation speed is not critical with respect to the formation of the radicals. With stirring a proper mixing and homogeneous radical concentration is achieved. Practically, however, the circulation speed is responsible for taking care of exotherms. This means that at the beginning of the reaction under constant irradiation condition, the slower the circulation speed, the more radicals are produced per path, which results in more reaction and a higher polymerization rate, which translates to higher exotherms. On the other hand, at the beginning of the reaction the faster the speed, the lower the radical generation and the lower the temperature rises. These effects can be leveled out with appropriate cooling.

Preferably, the light needed for the irradiation has to be homogeneous. It can be obtained with different light sources by conventional methods known to those skilled in the art. For example, the light emitted from a bulb and falling onto the reactor is collimated by a semi-elliptical reflector. This light is homogenous enough for the inventive process and allows less than 10% discrepancy of intensity between different measurement points of the irradiated window surface. It is not imperative to place the reactor in the focus of the reflector as long as the intensity and homogenity of the light is sufficient to help generate a homogeneous potential of radicals in the reactor and as long as the homogenous distribution of the radicals in the reactor is controled by appropriate stirring.

To avoid absorption of light by the monomer itself, optionally a filter cutting all radiations below a certain wavelength may be placed between the light source and the reactor. Filter, for example from the company Schott e.g. WG 305, WG 320, WG 335 or WG 345, are suitable for the process.

For the irradiation of the reaction mixture in the instant process light emitting radiation of the wavelenghts from 305 nm to 450 nm is used. Preferably the process is conducted employing wavelenghts from 335–400 nm.

Generally, all lamps emitting light in the region where the photoinitiator absorbs and generates the radicals are suitable for the instant process. These can be, for example, medium pressure mercury lamps or doted (with metal halides) microwave energized Fusion bulbs. For example Fusion lamps, also the ones designed for the irradiation of large areas, as described from R. W. Stowe (Rockville Md.) on the Radcure conference in Florence 1989 are suitable for the instant processes. Especially the H- D- and M-bulb emit light in the range needed for the instant process. Further, other doped lamps, as for example metal halide lamps MO 23 and MO 61 can be employed in the instant process. It is also possible to work the instant process with laser light of the corresponding wavelength.

The distance from the lamp to the reactor window is critical, because it is related to the quantitiy of W/cm² received by the solution. A homogeneous light emission, capable of producing a sufficient amount of initiating radicals from the photoinitiator has to be guaranteed. Normally, the optimal distance depends on the lamp used as well as on the irradiation surface of the reactor.

The duration of the irradiation depends on the desired degree of conversion of the monomers to polymers. This degree can, for example be determined by gas chromatographic analysis (GC). The irradiation is stopped, as soon as the desired degree of conversion is reached.

To insure, that the irradiation of the solution occurs only through the reactor window, the protection from light of the remaining parts of the reactor should be guaranteed by usual means like, for example, brown glass, steel tubing or aluminum foil.

The solution actually being irradiated is kept at a relatively constant temperature in the reactor cell, for example by using a cryostat or other means for controling temperatures. To insure control of the final properties of the polymer, the temperature of the reaction solution is kept within 2.5° C. of the desired reaction temperature (e.g. 25° C.±2.5° C.). Usually the reaction temperature is kept between −20° C. and +70° C., for example from 0° C. to +50° C., preferably from +25° C. to +50° C. It is also possible to let the temperature increase, for instance if a higher polymerization rate is wanted.

The monomers to be polymerized in the instant process, forming homo- or copolymers, include acrylic or methacrylic monomers and mixtures thereof, as well as mixtures thereof with styrene. Acrylic monomers are esters formed from acrylic acid or methacrylic acid and alcohols and the acids themselves are included as acrylic monomers. The monomer compounds may contain one olefinic double bond. Examples of suitable monomers are alkyl or hydroxyalkyl esters of acrylic and methacrylic acids, for example methyl, ethyl, butyl, 2-ethylhexyl or 2-hydroxyethyl, glycidyl, lauryl, isobornyl or hydroxypropyl esters of acrylic or methacrylic acids. Silicone acrylates are also of interest. Further examples of monomers are acrylonitrile, acrylamide, methacrylamide, N-substituted (meth)acrylamides, styrene, alkylstyrenes and halostyrenes.

Monomers containing more than one double bond are not suitable for the instant process to prepare oligomers, because with more than one double bond crosslinking occurs, which results in the formation of higher molecular weight polymers.

Preferred monomers are, for example, methyl acrylate, hydroxyethyl acrylate, hydroxypropyl acrylate and butyl acrylate. Further preferred monomers are methyl methacrylate, butyl methacrylate, hydroxyethyl methacrylate, hydroxypropyl methacrylate, glycidyl methacrylates, acrylic and methacrylic acid, acrylonitrile and styrene.

Generally, the solids content in the final polymer solution is ≦80%.

The conversion of the monomers to polymers is generally greater than or equal to 70%, preferably 90%, particularly 97%.

The photoinitiators, which are effective in the instant process have a molecular extinction coefficient ε ranging from 0.1 to 2000 and at least one maximum of absorption causing α-cleavage of the initiator compound in the range from 305 to 450 nm. These are especially compounds of the α-hydroxyketone type, phosphorus containing photoinitiators as well as the mixture of α-hydroxyketone compounds with phosphorous containing photoinitiators. Especially preferred is a process, wherein a photoinitiator or a photoinitiator mixture having a molar extinction coefficient ε from 0.1–200 is employed.

Preferred is a process, wherein the photoinitiator is of the formula I wherein

Ar is unsubstituted phenyl or phenyl substituted by halogen, CN, OH, $C_1$–$C_{17}$alkoxy, phenoxy, $C_2$–$C_{12}$alkenyl, —S—$C_1$–$C_{12}$alkyl, —S-phenyl, —$SO_2$—$C_1$–$C_{12}$alkyl, —$SO_2$-phenyl, —$SO_2NH_2$, —$SO_2NH$—$C_1$–$C_{12}$alkyl, —$SO_2$—$N(C_1$–$C_{12}$-alkyl$)_2$, —NH—$C_1$–$C_{12}$alkyl, —$N(C_1$–$C_{12}$alkyl$)_2$ or —NH—CO-phenyl, isocyanate or masked isocyanate, or Ar is substituted with $C_1$–$C_{12}$alkyl, which $C_1$–$C_{12}$alkyl is unsubstituted or substituted by halogen, OH, CN, $NH_2$, COOH, isocyanate, masked isocyanate, alkenyl or masked alkenyl, or Ar is thienyl, pyridyl, furyl, indanyl or tetrahydronaphthyl;

$R_1$ is $C_1$–$C_8$alkyl, which is unsubstituted or substituted by OH, CN, $NH_2$, —$NHC_1$–$C_{12}$alkyl, $N(C_1$–$C_{12}$alkyl$)_2$, NH—CO-phenyl, isocyanate or masked isocyanate, $C_2$–$C_{12}$alkenyl, halogen, $C_1$–$C_{12}$alkoxy, COOH, —(CO)O—$C_1$–$C_{12}$alkyl, —O—(CO)—$C_1$–$C_8$alkyl or $NR_3R_4$, or $R_1$ is $C_3$–$C_5$alkenyl, cyclopentyl, cyclohexyl or phenyl-$C_1$–$C_3$alkyl;

$R_2$ has one of the meanings given for $R_1$ or is a group —$CH_2CH_2R_5$, or $R_2$ together with $R_1$ is $C_2$–$C_8$alkylene, $C_3$–$C_9$oxaalkylene, $C_3$–$C_9$azaalkylene, or an exomethylene cyclohexane ring, wherein the $C_2$–$C_8$alkylene, $C_3$–$C_9$oxaalkylene, $C_3$–$C_9$azaalkylene, or exomethylene cyclohexane ring is unsubstituted or substituted by OH, CN, halogen, $C_1$–$C_{12}$alkoxy, —(CO)O—$C_1$–$C_{12}$alkyl, —O—(CO)—$C_1$–$C_8$alkyl or $NR_3R_4$;

$R_3$ is $C_1$–$C_{12}$alkyl, $C_2$–$C_4$alkyl which is substituted by OH, $C_1$–$C_8$alkoxy or CN, or $R_3$ is $C_3$–$C_5$alkenyl, cyclohexyl, phenyl-$C_1$–$C_3$alkyl, unsubstituted phenyl or phenyl, which is substituted by Cl, $C_1$–$C_4$alkyl, OH, $C_1$–$C_4$alkoxy or —(CO)O—$C_1$–$C_8$alkyl;

$R_4$ is $C_1$–$C_{12}$alkyl, $C_2$–$C_4$alkyl which is substituted by OH, $C_1$–$C_8$alkoxy or CN, or $R_4$ is $C_3$–$C_5$alkenyl, cyclohexyl or phenyl-$C_1$–$C_3$alkyl, or $R_4$ together with $R_3$ is $C_4$–$C_5$alkylene, which may be interrupted by —O— or —$NR_6$—, or $R_4$ together with $R_2$ is $C_1$–$C_9$alkylene, $C_2$–$C_3$oxaalkylene or $C_2$–$C_3$azaalkylene;

$R_5$ is —CO—$NH_2$, —CO—NH—$C_1$–$C_8$alkyl, —CO—N($C_1$–$C_8$alkyl$)_2$, —P(O)(O—$C_1$–$C_8$alkyl$)_2$ 2-pyrridyl or 2-oxo-1-pyrroldinyl; and $R_6$ is $C_1$–$C_4$alkyl, —$CH_2CH_2CN$ or —$CH_2CH_2(CO)O$—$C_1$–$C_8$alkyl.

$C_1$–$C_{17}$alkoxy is linear or branched and is for example $C_1$–$C_{12}$alkoxy, $C_1$–$C_8$- or $C_1$–$C_6$alkoxy, especially $C_1$–$C_4$alkoxy. Examples are methoxy, ethoxy, propoxy, isopropoxy, n-butyloxy, sec-butyloxy, iso-butyloxy, tert-butyloxy, pentyloxy, hexyloxy, heptyloxy, 2,4,4-trimethylpentyloxy, 2-ethylhexyloxy, octyloxy, nonyloxy, decyloxy, dodecyloxy, tetradecyloxy, pentadecyloxy, hexadecyloxy or heptadecyloxy especially methoxy, ethoxy, propoxy, isopropoxy, n-butyloxy, sec-butyloxy, iso-butyloxy, tert-butyloxy, preferably methoxy. $C_1$–$C_{12}$alkoxy, $C_1$–$C_8$alkoxy and $C_1$–$C_4$alkoxy have the same meanings as given above up to the appropriate number of C-atoms.

$C_2$–$C_{12}$alkenyl is one or more times unsaturated and is for example $C_2$–$C_8$-alkenyl, $C_2$–$C_6$- or $C_3$–$C_5$-alkenyl, especially $C_2$–$C_4$-alkenyl. Examples are allyl, methallyl, 1,1-dimethylallyl, 1-butenyl, 3-butenyl, 2-butenyl, 1,3-pentadienyl, 5-hexenyl, 7-octenyl, nonenyl, dodecenyl, especially allyl.

$C_3$–$C_5$alkenyl has the same meanings as given above up to the appropriate number of C-atoms.

$C_1$–$C_{12}$alkyl is linear or branched and is for example $C_1$–$C_{10}$-, $C_1$–$C_8$- or $C_1$–$C_6$alkyl, especially $C_1$–$C_4$alkyl. Examples are methyl, ethyl, propyl, isopropyl, n-butyl, sec-butyl, iso-butyl, tert-butyl, pentyl, hexyl, heptyl, 2,4,4-trimethyl-pentyl, 2-ethylhexyl, octyl, nonyl, decyl, undecyl or dodecyl, preferably methyl or butyl.

$C_1$–$C_8$alkyl and $C_2$–$C_4$alkyl have the same meanings as given above up to the appropriate number of C-atoms.

In the terms —S—$C_1$–$C_{12}$alkyl, —$SO_2$—$C_1$–$C_{12}$alkyl, —COO—$C_1$–$C_{12}$alkyl, —$SO_2NH$—$C_1$–$C_{12}$alkyl, —$SO_2$—N($C_1$–$C_{12}$-alkyl$)_2$, —NH—$C_1$–$C_{12}$alkyl and —N($C_1$–$C_{12}$alkyl$)_2$, $C_1$–$C_{12}$alkyl has the meanings given above. In the groups —O—(CO)—$C_1$–$C_8$alkyl, —CO—NH—$C_1$–$C_8$alkyl, —CO—N($C_1$–$C_8$alkyl$)_2$, —$CH_2CH_2$(CO)O—$C_1$–$C_8$alkyl and —P(O)(O—$C_1$–$C_8$alkyl$)_2$ $C_1$–$C_8$alkyl has the same meanings as given above.

If $C_1$–$C_{12}$alkyl is substituted with halogen, there are, for example 1 to 3 or 1 or 2 halogen substituents located at the alkyl.

The term "masked isocyanate" means a protected isocyanate group, namely an isocyanate group, which is blocked by chemical groups, which under specific reaction conditions can be removed. So, the formation of an oxime results in a masked isocyanate group. Examples are given, for example in J. Coatings Technology, Vol. 61, No. 775 (August 1989). The blocking/deblocking mechanism is, for example, demonstrated by the following equation: R—N—(CO)—X (blocked isocyanate)

R—N=C=O+HX On the left side the blocked isocyanate is not susceptible to reactions in the formulation, while on the right side the influence of temperature (>120° C.) deblocks HX and liberates the isocyanate group, which is now able to take part in further reactions, for example with crosslinkers. Suitable blocking agents HX are, for example, phenol, caprolactam, methyl ethyl ketoxime and diethyl malonate.

Phenyl-$C_1$–$C_3$alkyl is, for example, benzyl, phenylethyl, α-methylbenzyl, Phenylpropyl, or α,α-dimethylbenzyl, especially benzyl.

$C_2$–$C_8$alkylene is linear or branched alkylene as, for example, methylene, ethylene, propylene, 1-methylethylene, 1,1-dimethylethylene, butylene, 1-methylpropylene, 2-methylpropylene, pentylene, hexylene, heptylene or octylene, especially hexylene. $C_4$–$C_5$alkylene is linear or branched, for example, 1,1-dimethylethylene, butylene, 1-methylpropylene, 2-methylpropylene or pentylene.

$C_4$–$C_5$alkylene, which may be interrupted by —O— or —$NR_6$—, is, for example, —$CH_2CH_2$—O—$CH_2CH_2$—, —$CH_2CH_2$—($NR_6$)—$CH_2CH_2$—, —$CH_2$—O—$CH_2CH_2CH_2$—, —$CH_2$—($NR_6$)—$CH_2CH_2CH_2$— or —$CH_2CH_2$—O—$CH_2CH_2CH_2$—.

$C_3$–$C_9$oxaalkylene can contain, for example, 1–3 or 1 or 2 O-atoms, especially 1 O-atom and means for example, —CH$_2$—O—CH$_2$—, —CH$_2$CH$_2$O—CH$_2$CH$_2$—, —CH$_2$—CH(CH$_3$)—O—CH$_2$CH$_2$CH$_2$— or —[CH$_2$CH$_2$O]$_y$, wherein y=1–4.

C$_3$–C$_9$azaalkylene can contain, for example, 1–3 or 1 or 2 (NR$_6$)-groups, especially 1 such group and means, for example, —CH$_2$—(NR$_6$)—CH$_2$—, —CH$_2$CH$_2$—(NR$_6$)—CH$_2$CH$_2$—, —CH$_2$—CH(CH$_3$)—(NR$_6$)—CH$_2$CH$_2$CH$_2$— or —[CH$_2$CH$_2$(NR$_6$)]$_y$, wherein y=1–4 and wherein R$_6$ has the meanings given above.

The exomethylen cyclohexane ring has the following structure

Halogen is fluorine, chlorine, bromine and iodine, especially chlorine and bromine, preferably chlorine.

Preferably Ar in the formula I is unsubstituted phenyl or phenyl substituted by C$_1$–C$_{12}$alkyl or phenyl substituted by C$_1$–C$_4$alkyl, which is substituted with OH, R$_1$ and R$_2$ are C$_1$–C$_4$alkyl, or R$_2$ together with R$_1$ and the C-atom to which they are bonded, are C$_2$–C$_8$alkylene.

Suitable compounds of the formula I are phenyl-1-hydroxycyclohexylketone (®Irgacure 184; Ciba-Geigy AG);

4-dodecylphenyl-2-hydroxy-prop-2-yl ketone;

4-isopropylphenyl-2-hydroxy-prop-2-yl ketone;

2-hydroxy-2-methyl-1-phenyl-propanone;

[4-(2-hydroxyethyl)-phenyl]-2-hydroxy-prop-2-yl ketone;

4-methylphenyl-2-hydroxy-prop-2-yl ketone

[4-(2-carboxyethyl)-phenyl]-2-hydroxy-prop-2-yl ketone.

Especially preferred are phenyl-1-hydroxycyclohexylketone, 2-hydroxy-2-methyl-1-phenyl-propanone, [4-(2-hydroxyethyl)-phenyl]-2-hydroxy-prop-2-yl ketone and [4-(2-carboxyethyl)-phenyl]-2-hydroxy-prop-2-yl ketone.

The photoinitators according to the formula I are known, some of the compounds are commercially available and the art-skilled is familiar with their preparation. The compounds and their preparation are, for example, disclosed in U.S. Pat. Nos. 4,308,400; 4,315,807; 4,318,791; 4,721,734; 4,347,111; 4,477,681; 4,861,916; 5,045,573.

Further preferred is a process, wherein the photoinitiator is a mixture at least one compound of the formula I and at least one phosphorus containing photoinitator of the formula IIa or IIb (IIa)

(IIb)

wherein

R$_7$ and R$_8$ independently of one another are C$_1$–C$_{18}$alkyl, cyclohexyl, cyclopentyl, phenyl, naphthyl or biphenyl, wherein the cyclohexyl, cyclopentyl, phenyl, naphthyl or biphenyl are unsubstituted or substituted by halogen, C$_1$–C$_{12}$alkyl and/or C$_1$–C$_{12}$alkoxy, or R$_7$ and R$_8$ are a 5- or 6-membered S- or N-containing heterocyclic ring;

R$_9$ and R$_{10}$ independently of one another are cyclohexyl, cyclopentyl, phenyl, naphthyl or biphenyl, which residues are unsubstituted or substituted by halogen, C$_1$–C$_4$alkyl and/or C$_1$–C$_4$alkoxy, or R$_9$ and R$_{10}$ are a 5- or 6-membered S- or N-containing heterocyclic ring, or R$_9$ and R$_{10}$ together with the P-atom to which they are bonded from a ring, which contains from 4 to 10 carbon atoms and which ring may be substituted by 1 to 6 C$_1$–C$_4$alkyl radicals.

C$_1$–C$_{18}$Alkyl is branched or unbranched alkyl and is, for example, C$_1$–C$_{12}$-, C$_1$–C$_{10}$-, C$_1$–C$_8$- or C$_1$–C$_6$-alkyl, especially C$_1$–C$_4$alkyl. Examples are methyl, ethyl, propyl, iso-propyl, n-butyl, sec-butyl, tert-butyl, pentyl, hexyl, heptyl, octyl, 2-ethylhexyl, 2,4,4-trimethyl-pentyl, decyl, dodecyl, tetradecyl, heptadecyl or octadecyl. C$_1$–C$_{12}$alkyl has the same meanings as given above up to the appropriate number of C-atoms Preferably R$_8$ as alkyl is C$_4$–C$_8$alkyl, for example n-butyl, tert-butyl, isobutyl, sec-butyl,n-octyl, 2,4,4-trimethylpentyl.

C$_1$–C$_{12}$alkoxy is linear or branched and is for example C$_1$–C$_8$- or C$_1$–C$_6$alkoxy, especially C$_1$–C$_4$alkoxy. Examples are methoxy, ethoxy, propoxy, isopropoxy, n-butyloxy, sec-butyloxy, iso-butyloxy, tert-butyloxy, pentyloxy, hexyloxy, heptyloxy, 2,4,4-trimethylpentyloxy, 2-ethylhexyloxy, octyloxy, nonyloxy, decyloxy or dodecyloxy, especially methoxy, ethoxy, propoxy, isopropoxy, n-butyloxy, sec-butyloxy, iso-butyloxy, tert-butyloxy, preferably methoxy.

Halogen is fluorine, chlorine, bromine and iodine, especially chlorine and bromine, preferably chlorine.

Naphthyl means α-naphthyl and β-naphthyl.

Substituted cyclopentyl, cyclohexyl, phenyl, naphthyl or biphenyl have, for example 1–5, 1–4, three, two or one substiutents. For substituted phenyl the substituion in 4-, 2,5-, 2-, 2,6- or 2,4,6-position is preferred. Examples for such groups are 4-chlorophenyl, 2,6-dichlorophenyl, 2,4,6-trichlorophenyl, difluorophenyl, 2-tolyl, 4-tolyl, ethylphenyl, tert-butylphenyl, dodecylphenyl, 4-methoxyphenyl, 2-methoxyphenyl, 2,6-dimethoxyphenyl, ethoxyphenyl, hexyloxyphenyl, 2,4-dimethylphenyl, 2,4,6-trimethylphenyl, methyinaphthyl, isopropyinaphthyl, chloronaphthyl or ethoxynaphthyl. Furthermore, such groups are, for example, methoxyethylphenyl, ethoxymethylphenyl.

R$_9$ and R$_{10}$ preferably are substituted phenyl, for example 2,6-dimethoxyphenyl, 2,6-dichlorphenyl, 2,4,6-trimethylphenyl, especially 2,4,6-trimethylphenyl.

A 5- or 6-membered S- or N-containing heterocyclic ring is, for example, thienyl, pyrryl, pyrazolyl, thiazolyl, pyridyl or 1,3-, 1,2- or 1,4-diazyl, preferably thienyl or pyrryl.

If R$_9$ and R$_{10}$ together with the P-atom to which they are bonded form a ring containing 4 to 10 C-atoms this ring is monocyclic, bicyclic or tricyclic. A monocyclic ring formed by R$_9$ and R$_{10}$ together with the P-atom is preferably a phosphacyclopentane ring. A bicyclic ring formed by R$_9$ and R$_{10}$ together with the P-atom is preferably a phosphabicyclohexane or phosphabicyclononane ring. A tricyclic ring formed by R$_9$ and R$_{10}$ together with the P atom is preferably a (6H)-dibenzo[c,e][1,2]oxaphosphorine ring.

R$_9$ and R$_{10}$ are preferably 2,6-dimethoxyphenyl, 2,6-dimethylphenyl, 2,6-dichlorophenyl or especially 2,4,6-trimethylphenyl.

R$_7$ and R$_8$ preferably are C$_1$–C$_{18}$alkyl, cyclohexyl, cyclopentyl, phenyl or phenyl substituted with C$_1$–C$_4$alkyl.

Specifically preferred $R_7$ and $R_8$ are n-butyl, tert-butyl, isobutyl, sec-butyl, n-octyl, 2,4,4-trimethylpentyl, phenyl or 2,5-dimethylphenyl.

The photoinitators according to the formulae IIa and IIb are known, some are commercially available compounds and the art-skilled is familiar with their preparation. The compounds and their preparation are, for example, disclosed in U.S. Pat. Nos. 4,792,632; 4,737,593; 4,298,738; 5,218,009; 5,399,770; 5,472,992.

Suitable compounds of the formula IIa and IIb are 2,4,6-trimethylbenzoyl-diphenyl-phosphine oxide;

bis(2,4,6-trimethylbenzoyl)-2,4-di(3-methyl-but-1-oxy) phenyl-phosphine oxide;

bis(2,4,6-trimethylbenzoyl)-2,4-dipentoxyphenyl-phosphine oxide;

bis(2,4,6-trimethylbenzoyl)-2-methyl-prop-1-yl-phosphine oxide;

bis(2,6-dimethoxybenzoyl)-2,4,4-trimethylpent-1-yl-phosphine oxide;

bis(2,4,6-trimethylbenzoyl)-phenyl phosphine oxide;

Examples for photoinitiator mixtures suitable for the instant processes are a mixture of bis(2,6-dimethoxybenzoyl)-2,4,4-trimethylpent-1-yl-phosphine oxide with 2-hydroxy-2-methyl-1-phenyl-propanone;

a mixture of 2-hydroxy-2-methyl-1-phenyl-propanone with (2,4,6-trimethylbenzoyl)-diphenyl phosphine oxide;

a mixture of phenyl-1-hydroxycyclohexylketone with bis (2,6-dimethoxybenzoyl)-2,4,4-trimethylpent-1-yl-phosphine oxide;

a mixture of phenyl-1-hydroxycyclohexylketone with bis (2,4,6-trimethylbenzoyl)-2-methyl-prop-1-yl-phosphine oxide;

a mixture of phenyl-1-hydroxycyclohexylketone with bis (2,4,6-trimethylbenzoyl)-phenyl phosphine oxide;

a mixture of phenyl-1-hydroxycyclohexylketone with bis (2,4,6-trimethylbenzoyl)-2,4-dipentoxyphenyl-phosphine oxide;

a mixture of 2-hydroxy-2-methyl-1-phenyl-propanone with bis(2,4,6-trimethylbenzoyl)-2-methyl-prop-1-yl-phosphine oxide;

a mixture of 2-hydroxy-2-methyl-1-phenyl-propanone with bis(2,4,6-trimethylbenzoyl)-phenyl phosphine oxide;

a mixture of 2-hydroxy-2-methyl-1-phenyl-propanone with bis(2,4,6-trimethylbenzoyl)-2,4-dipentoxyphenyl-phosphine oxide.

The range of the α-hydroxyketone photoinitiator, compounds of the formula I respectively, in the mixtures of these compounds with phosphorus containing photoinitiators, compounds of the formula IIa or IIb respectively, is, for example 50–95% by weight. Preferably the amount of the compounds of the formula I in the mixture is 50–75%, especially 75%.(based on 100% by weight of the total mixture).

Of interest is a process, wherein the formula I Ar is unsubstitued phenyl or phenyl substituted by $C_1$–$C_{12}$alkyl, which $C_1$–$C_{12}$alkyl is unsubstituted or substituted by OH or COOH, $R_1$ and $R_2$ are $C_1$–$C_{18}$alkyl or $R_1$ together with $R_2$ is $C_2$–$C_8$alkylene, and wherein the formula IIa or the formula IIb $R_7$ and $R_8$ independently of one another are $C_1$–$C_{12}$alkyl or phenyl, wherein the phenyl is unsubstituted or substituted by $C_1$–$C_8$alkyl and/or $C_1$–$C_8$alkoxy and $R_9$ and $R_{10}$ independently of one another are phenyl, which is substituted by halogen, $C_1$–$C_4$alkyl and/or $C_1$–$C_4$alkoxy.

Preferred is, for example, a mixture of 2-hydroxy-2methyl-1-phenyl-propanone with bis(2,6-dimethoxybenzoyl)-2,4,4-trimethylpent-1-yl-phosphine oxide. Especially preferred is the above mixture with an amount of 2-hydroxy-2methyl-1-phenyl-propanone of 75% by weight.

Also preferred, for example, is a mixture of 2-hydroxy-2methyl-1-phenyl-propanone with 2,4,6-trimethylbenzoyl-phenyl-phosphine oxide. Especially preferred is the above mixture with an amount of 2-hydroxy-2methyl-1-phenyl-propanone of 50% by weight.

The composition to be (co)polymerized in the instant process expediently contains the photoinitiator of the formula I, IIa or IIb, or the photoinitiator mixture of the compounds of the formulae I and IIa or IIb in an amount of from 0.1 to 15% by weight, preferably from 0.2 to 5% by weight, based on the total solids content.

Interesting is a process, wherein a photoinitiator has a long thermal half life. The term "half life" in this connection is directed to the thermal decomposition of the photoinitiator compound in the absence of light. For practical purposes, half lives over 10 hours under operating conditions are adequate. Interesting is therefore a process, wherein a photoinitiator with a thermal "half life" of more than 10 h at 70° C. is used.

Also important is a process, wherein the solvent is an alkane, a ketone, an alcohol, an ester or a mixture thereof. Examples for suitable solvents are petroleum ether (with a boiling range higher than the reaction temperature), or pure alkanes, such as pentane, hexane, octane, isooctane, heptane, or ethyl acetate, propyl, isopropyl, butyl or hexyl acetate, acetone, methylethyl ketone, methanol, ethanol, isopropanol or water. Especially preferred in the instant process are solvents, which are not published in the list of "Hazardous Air Polluting Solvents" (HAPS), that means preferably is conducted in a HAPS-free reaction mixture.

It is also possible to conduct the instant process as an emulsion polymerisation. In this case the monomers are diluted in water and emulsifiers are added to the reaction mixture. Optionally solvents can be used.

A further object of the invention therefore is a process as described above, which is conducted as an emulsion polymerisation.

It is further possible to conduct the process in the presence of chain transfer agents.

Another object of the invention therefore is a process according to claim 1 or 2, wherein a chain transfer agent is added.

Useful examples for chain transfer agents include N-phenylglycine, trimethyl barbituric acid, 2-mercaptobenzoxazole, 2-mercaptobenzothiazole, N, N-dimethyl-2,6-diisopropylaniline, N, N-2,4,6-pentamethylaniline and other compounds having a hydrogen that can be easily extracted with a radical. Especially suitable are mercaptan compounds as, for example mercaptoethanol, dodecane thiol, thioglycolic acid, 3-mercaptopropionic acid, 2-aminoethane thiol.

Preferred is a process wherein the chain transfer agent is mercaptoethanol, dodecanethiol, t-butyl mercaptan, thioglycolic acid, 3-mercapto propionic acid or 2-amino ethanethiol.

With the above described process homo- or co-oligomers with a weight average molecular weight (Mw) from 1000–20000, for example 1000–15000 or 1000–13500, preferably 3500–13500 are prepared.

The oligomers prepared with the instant process can be used for various purposes, for example for the production of printing inks, varnishes, white paints, coating compositions, inter alia for paper, wood, metal or plastic, for the production of coloured pigmented paints, daylight-curable coatings for buildings and road markings, for the preparation of clear or pigmented aqueous dispersions, for the production of printing plates, for the production of masks for screen printing, as dental filling materials, for the production of adhesives, of etch or permanent resists and of solder stop masks for printed electronic circuits, for the production of three-dimensional articles by bulk curing (UV curing in transparent moulds) or for the production of formulations used in the stereolithography process, as described, for example, in U.S. Pat. No. 4 575 330, for the preparation of composite materials (for example styrenic polyesters, which may contain glass fibres and other assistants) and other thick-layer compositions, for the production of coatings for encapsulation of electronic parts or for the production of coatings for optical fibres.

Further objects of the invention are the oligomers obtained by the above described process, as well as the use of these oligomers for the preparation of coating formulations, preferably high solid paints, or a process for the preparation of coating formulations, preferably high solid paints, wherein oligomers obtained by the above described process are employed.

The examples below serve to further illustrate the invention. Parts and percentages are by weight unless otherwise specified, both in the remainder of the description and in the patent claims.

Where in the designations of alkyl radicals having more than 3 carbon atoms no specific isomers are indicated, these radicals are in each case the n-isomers.

In the following examples the following photoinitiators and photoinitiator mixtures are employed:

A 1-hydroxycyclohexyl phenyl ketone (®Irgacure 184; Ciba-Geigy AG)

B 2-hydroxy-2-methyl-1-phenyl-propanone (®Darocur 1173; Ciba-Geigy AG)

C 25% bis(2,6-dimethoxybenzoyl)-2,4,4-trimethylpentyl-phosphine oxide+75% 2-hydroxy-2-methyl-1-phenyl-propanone (®Irgacure 1700; Ciba-Geigy AG)

D 2-hydroxy-2-methyl-1(4-methylphenyl)-propanone

E 2-hydroxy-2-methyl-1[4(3-carboxypropyl)-phenyl]-propanone

F 2-hydroxy-2-methyl-1[4(2-hydroxyethyl)-phenyl]-propanone

G 15% bis(2,6-dimethoxybenzoyl)-2,4,4-trimethylpentyl-phosphine oxide+85% 2-hydroxy-2-methyl-1-phenyl-propanone H 15% bis(2,6-dimethoxybenzoyl)-2,4,4-trimethylpentyl-phosphine oxide+85% 1-hydroxycyclohexyl phenyl ketone I bis(2,6-dimethoxybenzoyl)-2,4,4-trimethylpentyl-phosphine oxide The gas chromatographic analysis (GC), for the determination of residual monomer content, is conducted in a Hewlett-Packard chromatograph (HP 5890 Series II fitted with a HP 3396 Series II integrator. Column characteristics: 30 meters DBS-column J&W Scientific N° 122–503 0.25 m×30 m (1μ film thickness).

The gel permeation chromatographic analysis (GPC), for the determination of Mw and dispersity is also conducted with a Hewlett-Packard HP 1090 fitted with a RI-detector HP 1037 or 1047. The columns used are Ultrastyragel $10^3$–$10^6$ Angstroem.

EXAMPLE 1

A mixture of 1.8 g of photoinitiator A (3% on solution), 25.2 g of butylmethacrylate, 16.8 g of hydroxypropylacrylate (a mixture of 2- and 3-hydroxypropyl-acrylate) in 8.1 g of butylacetate and 8.1 g of petroleum ether (boiling range 110–140° C.; PE 110–140) as solvents is prepared and irradiated under inert gas for 90 minutes at 25° C. with a 6 inch (about 15.5 cm) Fusion H-bulb in a 13 $cm^2$ reactor as described above. The distance between the light source and the reactor using the set-up (B) is fixed at 6 cm. Further, a 345 nm-cut-off-filter was used. At the end of the reaction, the lamp is switched off and some hydroxymethylhydroquinone (HMHQ) dissolved in butyl acetate is added to prevent further polymerization reactions. The obtained colourless solution is then submitted to GC analysis to determine the residual monomer content and to GPC analysis for the determination of molecular weight. The weight average molecular weight (Mw) of the oligomer obtained is 14400, the polydispersity value (Mw/Mn) is 2.9. The degree of conversion of the monomers, determined by GC is 99%.

EXAMPLE 2

90 g of a solution containing 2.7 g of photoinitiator A (3% on solution), 37.8 g of butylmethacrylate, 25.2 g of hydroxypropylacrylate (a mixture of 2- and 3-hydroxypropylacrylate) in 24.3 g of ethylacetate is irradiated under inert gas for 75 minutes at 25° C. with a 6 inch (about 15.5 cm) Fusion D-bulb in a 26 $cm^2$ reactor as described in example 1. The distance between the lamp and the reactor window in set-up (B) is fixed at 12 cm. The obtained oligomer has a weight average molecular weight (Mw) 9200, a polydispersity value (Mw/Mn) 2.1 and a degree of monomer conversion of 98.5%.

EXAMPLE 3

The polymerizable mixture described in example 2 is irradiated using the set-up (A) with a distance between the reactor and the lamp of 23 cm. The reaction temperature is 25° C., and the irradiation is carried out for 80 minutes. The resulting oligomer has a molecular weight (Mw) 8000 and a polydispersity value (Mw/Mn) 2.5. The degree of conversion of monomer is 99%.

EXAMPLES 4–11

In the following examples 4–11 the process as described in example 1 is repeated. The same monomers as in example 1 are used, but other components and process parameters are changed. The respective reaction conditions and results are listed in table 1.

TABLE 1

| Example | Photoinitiator | Solvent | Weight average molecular weight | Polydispersity | Conversion [%] |
|---|---|---|---|---|---|
| 4 | A | $H_3C(CO)OC_2H_5$ | 12500 | 2.6 | 98.6 |
| 5 | B | $H_3C(CO)OC_4H_9$/PE110-140(1:1) | 11800 | 2.2 | 98.7 |
| 6 | C | $H_3C(CO)OC_4H_9$/PE110-140(1:1) | 11300 | 2.3 | 99.6 |
| 7 | D | $H_3C(CO)OC_4H_9$/PE110-140(1:1) | 12500 | 2.5 | 98.9 |
| 8 | E | $H_3C(CO)OC_4H_9$/PE110-140(1:1) | 14200 | 2.5 | 99.3 |
| 9 | F | $H_3C(CO)OC_4H_9$/PE110-140(1:1) | 15700 | 2.3 | 99.6 |
| 10 | G | $H_3C(CO)OC_2H_5$ | 10800 | 2.5 | 99.7 |
| 11 | H | $H_3C(CO)OC_4H_9$/PE110-140(1:1) | 12500 | 2.8 | 98.5 |

EXAMPLE 12

A mixture of 1.8 g of photoinitiator A, 1.8 g of mercaptoethanol, 25.2 g of butylmethacrylate, 16.8 g of hydroxypropylacrylate (a mixture of 2- and 3-hydroxypropyl-acrylate) in 7.8 g of butylacetate and 7.8 g of PE 110–140 as solvents is prepared and irradiated for 90 minutes under inert gas at 25° C. with a 6 inch (about 15.5 cm) Fusion H electrodeless lamp (Fusion Super 6) in a 13 cm² reactor described above.

The distance between the light source and the reactor is fixed at 6 cm in set-up (B). Further, a 345 nm-cut-off-filter was used.

At the end of the reaction, the lamp is switched off and some hydroxymethylhydroquinone (HMHQ) dissolved in butyl acetate is added to prevent further polymerization reactions. The weight average molecular weight (Mw) of the oligomer obtained is 4700, the polydispersity value (Mw/Mn) is 1.8. The degree of conversion of the monomers, determined by GC is 98.3%.

EXAMPLE 13

In the process described in example 1 12.0 g of methyl acrylate, 0.6 g of photoinitiator I and 47.4 g of acetic ethyl acetate are irradiated with the light of an H-bulb for 90 min at 25° C. The distance from lamp to reactor is fixed at 6 cm in set-up (B). The resulting oligomer has a weight average molecular weight of 15400 and a polydispersity value of 2.7. The conversion of the monomers is quantitative.

EXAMPLE 14

In the process described in example 1 18.0 g of methyl acrylate, 0.9 g of the photoinitiator A and 70.2 g of ethyl acetate are irradiated with the light of an D-bulb for 75 min (in a reactor with an irradiation surface of 26 cm² at a distance of 6.5 cm in set-up (B)) at 25° C. The resulting oligomer has a weight average molecular weight of 9700 and a polydispersity value of 2.9. The conversion of the monomers is quantitative.

EXAMPLE 15

In the process described in example 1 18.0 g of methyl acrylate, 0.9 g (1% on solution) of photoinitiator F and 70.2 g of ethyl acetate are irradiated with the light of an D-bulb for 75 min (in a reactor with an irradiation surface of 26 cm² at a distance of 6.5 cm using set-up (B)) at 25° C. The resulting oligomer has a weight average molecular weight of 10400 and a polydispersity value of 2.5. The conversion of the monomers is quantitative.

EXAMPLE 16

In the process described in example 1 18.0 g of methyl acrylate, 0.45 g (0.5% on solution) of photoinitiator F and 71.1 g of ethyl acetate are irradiated with the light of an D-bulb for 45 min (in a reactor with an irradiation surface of 26 cm² at a distance of 12 cm in set-up (B)) at 25° C. The resulting oligomer has a weight average molecular weight of 14400 and a polydispersity value of 1.8. The conversion of the monomers is 97%.

EXAMPLE 17

In the process described in example 1 12.0 g of methylacrylate, 0.6 g of photoinitiator A, 0.12 g (0.2 % on solution) of mercaptoethanol and 47.3 g of ethyl acetate are irradiated with the light of an H-bulb for 90 min at 25° C. at a distance of 6 cm using set-up (B). The resulting oligomer has a weight average molecular weight (Mw) of 2400, and a polydispersity value (Mw/Mn) of 2.0. The conversion of the monomer is quantitative.

EXAMPLE 18

In the process described in example 1 12.0 g of methylacrylate, 0.6 g of photoinitiator A, 0.6 g (1%/solution) of mercaptoethanol and 46.8 g of ethyl acetate are irradiated with the light of an H-bulb for 90 min at 25° C. at a distance of 6 cm using the set-up (B). The resulting oligomer has a weight average molecular weight (Mw) of 2500 and a polydispersity value (Mw/Mn) of 1.7. The conversion of the monomers is quantitative.

EXAMPLE 19

In the process described in example 1 18.0 g of methylacrylate, 0.9 g of photoinitiator F (1% on solution), 0.9 g of mercaptoethanol and 70.2 g of ethyl acetate are irradiated with the light of a D-bulb for 48 min at 25° C. a distance of 12 cm using the set-up (B). The resulting oligomer has a weight average molecular weight (Mw) of 2500 and a polydispersity value (Mw/Mn) of 1.6. The conversion of the monomers is 97.5%.

EXAMPLE 20

In the process described in example 1, 63.0 g of vinyl acetate, 2.0 g of the photoinitiator A (3% on solution) and

24.3 g of ethyl acetate are irradiated with the light of a D-bulb for 55 min. at 25° C. at a distance of 13 cm using the set-up (B). The resulting oligomer has a weight average Molecular weight (Mw) of 27400 and a polydispersity (Mw/Mn) of 2.5. The conversion of the monomers is 98%.

EXAMPLE 21

In the process described in example 1, 59.85 g of butyl methacrylate, 3.15 g of acrylic acid, 23.4 g of ethyl acetate and 3.6 g of the photoinitiator A are irradiated with the light of a D-Bulb at a distance of 22 cm using the set-up (A) for 80 min at 50° C. The resulting colourless oligomer has a weight average molecular weight (Mw) of 5100 and a polydispersity (Mw/Mn) of 2.4. The conversion of monomers is 94%.

What is claimed is:

1. Process for the preparation of
acrylate- or methacrylate-homo- or acrylate- or methacrylate-co-oligomers with a weight average molecular weight (Mw) from 1000 to 20000,
a polydispersity $\leq 3$
and a conversion of the monomers to polymers greater than or equal to 70%,
characterized in that
at least one acrylic or methacrylic monomer or a mixture of said acrylic monomers with styrene or with vinylacetate, butadiene, acrylamide, acrylonitrile, vinylidene chloride or vinyl chloride is irradiated in the presence of at least one α-hydroxyketone photoinitiator or at least one phosphorus containing photoinitiator of the formula IIa or IIb (IIa)

(IIb)

$R_7$ and $R_8$ independently of one another are $C_1$–$C_{18}$alkyl, cyclohexyl, cyclopentyl, phenyl, naphthyl or biphenyl, wherein the cyclohexyl, cyclopentyl, phenyl, naphthyl or biphenyl are unsubstituted or substituted by halogen, $C_1$–$C_{12}$alkyl and/or $C_1$–$C_{12}$alkoxy, or $R_7$ and $R_8$ are a 5- or 6-membered S- or N-containing heterocyclic ring;
$R_9$ and $R_{10}$ independently of one another are cyclohexyl, cyclopentyl, phenyl, naphthyl or biphenyl, which residues are unsubstituted or substituted by halogen, $C_1$–$C_4$alkyl and/or $C_1$–$C_4$alkoxy, or $R_9$ and $R_{10}$ are a 5- or 6-membered S- or N-containing heterocyclic ring, or $R_9$ and $R_{10}$ together with the P-atom to which they are bonded from a ring, which contains from 4 to 10 carbon atoms and which ring may be substituted by 1 to 6 $C_1$–$C_4$alkyl radicals;
or a mixture of an α-hydroxyketone photoinitiator with a phosphorus containing photoinitiator of formula IIa or IIb, said photoinitiator or photoinitiator mixture having a molar extinction coefficient ε from 0.1–2000 and at least one maximum of absorption, useful for the generation of radicals, in the range from 305 to 450 nm,
at a temperature from –20 to 70° C.
in a solvent or solvent mixture,
with light of a wavelength from 305 to 450 nm,
where the concentration of the polymer in the final solution is up to 80%.

2. Process for the preparation of
polyvinylacetate and its hydrolysis product polyvinylalcohol with a weight average molecular weight (Mw) from 1000 to 30000,
a polydispersity $\leq 3$
and a conversion of the monomers to polymers greater than or equal to 70%,
characterized in that
vinylacetate or a mixture of said vinylacetate with other vinylic monomers is irradiated in the presence of at least one α-hydroxyketone photoinitiator, at least one phosphorus containing photoinitiator of the formula IIa or IIb (IIa)

(IIb)

$R_7$ and $R_8$ independently of one another are $C_1$–$C_{18}$alkyl, cyclohexyl, cyclopentyl, phenyl, naphthyl or biphenyl, wherein the cyclohexyl, cyclopentyl, phenyl, naphthyl or biphenyl are unsubstituted or substituted by halogen, $C_1$–$C_{12}$alkyl and/or $C_1$–$C_{12}$alkoxy, or $R_7$ and $R_8$ are a 5- or 6-membered S- or N-containing heterocyclic ring;
$R_9$ and $R_{10}$ independently of one another are cyclohexyl, cyclopentyl, phenyl, naphthyl or biphenyl, which residues are unsubstituted or substituted by halogen, $C_1$–$C_4$alkyl and/or $C_1$–$C_4$alkoxy, or $R_9$ and $R_{10}$ are a 5- or 6-membered S- or N-containing heterocyclic ring, or $R_9$ and $R_{10}$ together with the P-atom to which they are bonded from a ring, which contains from 4 to 10 carbon atoms and which ring may be substituted by 1 to 6 $C_1$–$C_4$alkyl radicals;
or a mixture of an α-hydroxyketone photoinitiator with a phosphorus containing photoinitiator of formula IIa or IIb;
said photoinitiator or photoinitiator mixture having a molar extinction coefficient ε from 0.1–2000 and at least one maximum of absorption in the range from 305 to 450 nm,
at a temperature from –20 to 70° C.
in a solvent or solvent mixture,
with light of a wavelength from 305 to 450 nm,
where the concentration of the polymer in the final solution is up to 80%.

3. A process according to claim 2 or 3, where the conversion of the monomers to polymers is greater than or equal to 90%.

4. A process according to claim 2 or 3, where the conversion of the monomers to polymers is greater than or equal to 97%.

5. Process according to claim 2 or 3, wherein the photoinitiator is of the formula I a wherein Ar is unsubstituted phenyl or phenyl substituted by halogen, CN, OH, $C_1$–$C_{17}$alkoxy, phenoxy, $C_2$–$C_{12}$alkenyl, —S—$C_1$–$C_{12}$alkyl, —S-phenyl, —$SO_2$—$C_1$–$C_{12}$alkyl, —$SO_2$-phenyl, —$SO_2NH_2$, —$SO_2NH$—$C_1$–$C_{12}$alkyl, —$SO_2$—$N(C_1$–$C_{12}$-alkyl)$_2$, —NH—$C_1$–$C_{12}$alkyl, —$N(C_1$–$C_{12}$alkyl)$_2$ or —NH—CO-phenyl, isocyanate or masked isocyanate, or Ar is substituted with $C_1$–$C_{12}$alkyl, which $C_1$–$C_{12}$alkyl is unsubstituted or substituted by halogen, OH, CN, $NH_2$, COOH, isocyanate, masked isocyanate, alkenyl or masked alkenyl, or Ar is thienyl, pyridyl, furyl, indanyl or tetrahydronaphthyl;

$R_1$ is $C_1$–$C_8$alkyl, which is unsubstituted or substituted by OH, CN, $NH_2$, —$NHC_1$–$C_{12}$alkyl, $N(C_1$–$C_{12}$alkyl)$_2$, NH—CO-phenyl, isocyanate or masked isocyanate, $C_2$–$C_{12}$alkenyl, halogen, $C_1$–$C_{12}$alkoxy, COOH, —(CO)O—$C_1$–$C_{12}$alkyl, —O—(CO)—$C_1$–$C_8$alkyl or $NR_3R_4$, or $R_1$ is $C_3$–$C_5$alkenyl, cyclopentyl, cyclohexyl or phenyl-$C_1$–$C_3$alkyl;

$R_2$ has one of the meanings given for $R_1$ or is a group —$CH_2CH_2R_5$, or $R_2$ together with $R_1$ is $C_2$–$C_8$alkyiene, $C_3$–$C_9$oxaalkylene, $C_3$–$C_9$azaalkylene, or an exomethylene cyclohexane ring, wherein the $C_2$–$C_8$alkylene, $C_3$–$C_9$oxaalkylene, $C_3$–$C_9$azaalkylene, or exomethylene cyclohexane ring is unsubstituted or substituted by OH, CN, halogen, $C_1$–$C_{12}$alkoxy, —(CO)O—$C_1$–$C_{12}$alkyl, —O—(CO)—$C_1$–$C_8$alkyl or $NR_3R_4$;

$R_3$ is $C_1$–$C_{12}$alkyl, $C_2$–$C_4$alkyl which is substituted by OH, $C_1$–$C_8$alkoxy or CN, or $R_3$ is $C_3$–$C_5$alkenyl, cyclohexyl, phenyl-$C_1$–$C_3$alkyl, unsubstituted phenyl or phenyl, which is substituted by Cl, $C_1$–$C_4$alkyl, OH, $C_1$–$C_4$alkoxy or —(CO)O—$C_1$–$C_8$alkyl;

$R_4$ is $C_1$–$C_{12}$alkyl, $C_2$–$C_4$alkyl which is substituted by OH, $C_1$–$C_8$alkoxy or CN, or $R_4$ is $C_3$–$C_5$alkenyl, cyclohexyl or phenyl-$C_1$–$C_3$alkyl, or $R_4$ together with $R_3$ is $C_4$–$C_5$alkylene, which may be interrupted by —O— or —$NR_6$—, or $R_4$ together with $R_2$ is $C_1$–$C_9$alkylene, $C_2$–$C_{30}$oxaalkylene or $C_2$–$C_3$azaalkylene;

$R_5$ is —CO—$NH_2$, —CO—NH—$C_1$–$C_8$alkyl, —CO—N($C_1$–$C_8$alkyl)$_2$, —P(O)(O—$C_1$–$C_8$alkyl)$_2$ 2-pyrridyl or 2-oxo-1-pyrroldinyl; and $R_6$ is $C_1$–$C_4$alkyl, —$CH_2CH_2CN$ or —$CH_2CH_2(CO)O$—$C_1$–$C_8$alkyl.

6. Process according to claim 5, wherein

Ar in the formula I is unsubstituted phenyl or phenyl substituted by $C_1$–$C_{12}$alkyl or phenyl substituted by $C_1$–$C_4$alkyl, which is substituted with OH, $R_1$ and $R_2$ are $C_1$–$C_4$alkyl, or $R_2$ together with $R_1$ and the C-atom to which they are bonded, are $C_2$–$C_8$alkylene.

7. Process according to claim 5, wherein the formula I Ar is unsubstitued phenyl or phenyl substituted by $C_1$–$C_{12}$alkyl, which $C_1$–$C_{12}$alkyl is unsubstituted or substituted by OH or COOH, $R_1$ and $R_2$ are $C_1$–$C_{18}$alkyl or $R_1$ together with $R_2$ is $C_2$–$C_8$alkylene, and wherein the formula IIa or the formula IIb $R_7$ and $R_8$ independently of one another are $C_1$–$C_{12}$alkyl or phenyl, wherein the phenyl is unsubstituted or substituted by $C_1$–$C_8$alkyl and/or $C_1$–$C_8$alkoxy and $R_9$ and $R_{10}$ independently of one another are phenyl, which is substituted by halogen, $C_1$–$C_4$alkyl and/or $C_1$–$C_4$alkoxy.

8. Process according to claim 1 or 2, wherein the photoinitiator has a thermal "half life" of more than 10 h at 70° C.

9. Process according to claim 1 or 2, wherein the solvent is an alkane, a ketone, an alcohol, an ester, or a mixture thereof.

10. Process according to claim 1 or 2, wherein said process is conducted as an emulsion polymerisation.

11. Process according to claim 1 or 2, wherein a photoinitiator or photoinitiator mixture having a molar extinction coefficient e from 0.1–200 is employed.

12. Process according to claim 1 or 2, wherein a chain transfer agent is added.

13. Process according to claim 12, wherein the chain transfer agent is mercaptoethanol, dodecanethiol, t-butyl mercaptan, thioglycolic acid, 3-mercapto propionic acid or 2-amino ethanethiol.

14. Oligomer obtained by the process according to claim 1 or 2.

15. Coating formulation which comprises oligomers obtained by the process according to claim 1 or 2.

16. Coating formulation according to claim 15 which is a high solid paint.

* * * * *